(12) United States Patent
Bhalla et al.

(10) Patent No.: US 6,275,326 B1
(45) Date of Patent: Aug. 14, 2001

(54) CONTROL ARRANGEMENT FOR MICROELECTROMECHANICAL DEVICES AND SYSTEMS

(75) Inventors: Kulbir Singh Bhalla, Red Bank; Albert Maxwell Gottlieb, Maplewood, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/400,719

(22) Filed: Sep. 21, 1999

(51) Int. Cl.⁷ .................................................. G02B 26/08
(52) U.S. Cl. ..................... 359/298; 359/291; 359/214; 359/221; 359/224; 359/295
(58) Field of Search ..................... 359/298, 290, 359/291, 295, 214, 221, 222, 223, 224, 230; 73/105; 310/309

(56) References Cited

U.S. PATENT DOCUMENTS

| | | | |
|---|---|---|---|
| 4,560,925 | * 12/1985 | Niven et al. | 359/221 |
| 4,738,500 | * 4/1988 | Grupp et al. | 359/214 |
| 5,283,682 | * 2/1994 | Ostaszewski | 359/214 |
| 5,392,151 | * 2/1995 | Nelson | 359/224 |
| 5,408,253 | * 4/1995 | Iddan | 359/224 |
| 6,108,118 | * 8/2000 | Minamoto | 359/224 |

\* cited by examiner

Primary Examiner—Loha Ben
(74) Attorney, Agent, or Firm—Wilford L. Wisner

(57) ABSTRACT

A microelectromechanical system in which, operationally independent of the movable element and the component for moving it, a microelectromechanical sensor senses the position of the movable element. The microelectromechanical sensor adjoins the movable element, at least in part, and may be a strain gage, or a gage of a capacitive, piezoelectric, piezoresistive, or pressure type, among others. The resulting signal is fed back to control the component for moving the movable element. In an array of movable elements and sensors, the signal of each sensor is specific to one movable element.

16 Claims, 4 Drawing Sheets

CONTROL ARRANGEMENT FOR MICROELECTROMECHANICAL DEVICES AND SYSTEMS

TECHNICAL FIELD

This invention relates generally to the field of microelectromechanical devices and systems and in particular to communication, telemetry, and information processing using microelectromechanical devices and systems.

BACKGROUND OF THE INVENTION

Microelectromechanical devices have become increasingly used for applications for which no comparable non-mechanical electronic device is available. Even for switching applications for optical communication, telemetry, and information processing systems, for which non-mechanical electronic devices do exist, a need for augmented capabilities is frequently met by microelectromechanical devices.

Nevertheless, as increasing numbers of devices are fit into ever-smaller spaces, optical microelectromechanical devices (hereinafter, "MEMS") and particularly their constituent actuatable MEMS elements present an increasing problem of sensing their respective actuated positions. One frequently used technique for handling this problem involves illuminating the constituent elements with infrared radiation, typically coherent radiation, detecting the pattern of reflected radiation with a high-resolution infrared video camera, and employing a computer to calculate the respective positions from the detected pattern. Unfortunately, as the number of MEMS elements in a given area increases, and as their speed of actuation increases, the computer software required for timely, accurate calculations becomes ever more complex and less reliable.

Such position detection techniques may be termed indirect techniques. It has become desirable to have reliable direct detection techniques.

While some MEMS sensors for directly detecting the position of a actuated element have been developed for some applications, their feasibility is not readily apparent for dense arrays of MEMS elements requiring a correspondingly dense array of electronic actuation circuits. Position sensing must not interfere with element actuation.

SUMMARY OF THE INVENTION

According to the invention, direct position detection of MEMS elements is achieved without interference with their electronic actuation. It has been recognized, according to the invention, that position detection circuitry can have elements in common with MEMS element actuation circuitry, so long as the detection circuitry and actuation circuitry are operationally independent of each other.

Thus, in a microelectromechanical device having a microelectromechanical movable element, a base with respect to which the element is movable, and means for moving the movable element with respect to the base, there is provided means independent of the moving means, but in proximity thereto, for sensing the actual position of the movable element with respect to the base.

Advantageously, according to one feature of the invention, this sensing arrangement is densely integratable with large numbers of MEMS elements and their actuation circuits. Preferably, each movable MEMS element is associated with at least one sensor specifically arranged for that movable MEMS element. Optical cross-connect switching circuits provide an exemplary application of this type.

According to a further feature of the invention, the sensing means can employ any of a plurality of sensing gages, for example, strain gages, capacitive gages, piezoelectric gages, and piezoresistive gages, among others. Advantageously, such gages can be employed whether the actuation movement is linear, rotary, or a combination of linear and rotary.

In a first specific embodiment of the invention, MEMS strain gages are mounted under the MEMS element. The amount of strain is directly proportion to the movement of the MEMS element. Without increasing the amount of area occupied by the MEMS element, a plurality of strain gages per MEMS element may be used.

In a second specific embodiment of the invention, MEMS capacitance gages are integrated with the MEMS element. Movement of the MEMS element changes the capacitance between a plate on the back of the MEMS element and a plate on the mounting base of the MEMS element. Advantageously, the two plates can be the same as those used for actuating the MEMS element. Independence of actuation and sensing resides in actuating movement by essentially DC or low frequency voltage, while the capacitance measurement is made at a higher frequency not affecting actuation.

It is a further advantage of the present invention that sensing arrangements for arrays of MEMS elements are relatively easy to design and have a shorter response time and greater reliability than the prior art reflected light arrangements.

Further features and advantages of the invention will become apparent from the following description.

BRIEF DESCRIPTION OF THE DRAWING

The teachings of the present invention can be readily understood by considering the following detailed description in conjunction with the accompanying drawings, in which.

DETAILED DESCRIPTION

Preferred implementations of the various aspects of the invention will now be described while referring to the figures, several of which may be simultaneously referred to during the course of the following description.

Figure 1:
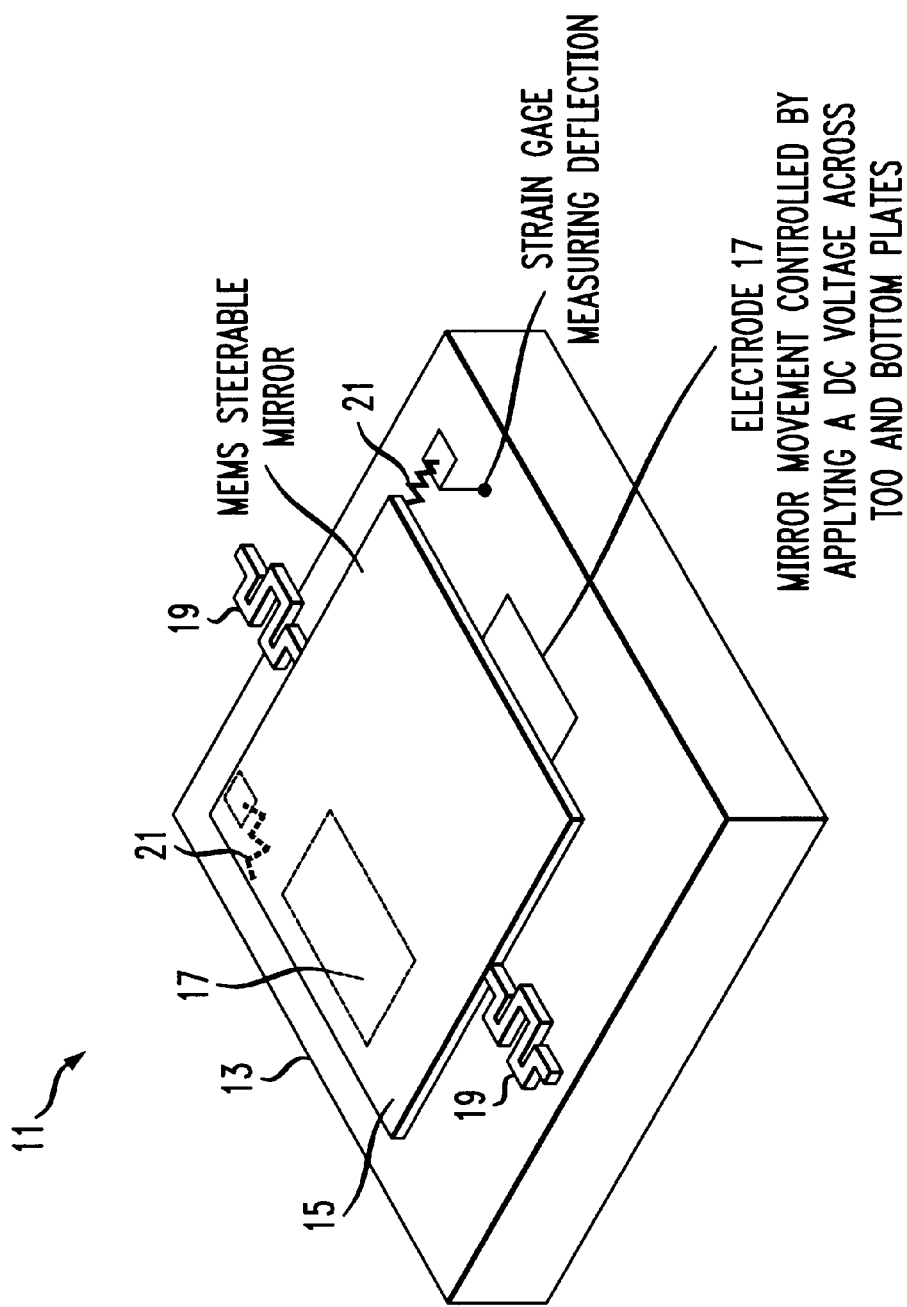
FIG. 1 is a pictorial illustration of a first embodiment of the invention.

In FIG. 1 MEMS device 11 has a semiconductor wafer substrate forming a base 13 for a MEMS element array, of which MEMS steerable mirror 15 is a typical element. MEMS steerable mirror 15 is suspended on springs 19 which support it in a nominal position parallel to base 13. Plate electrodes 17 form a pair of parallel plate capacitors with the conductive back of MEMS steerable mirror 15. Electrodes 17 are arranged so that opposite polarity voltages on one side of mirror 15 apply a pulling deflection torque while the voltages on the other side are 'off'. Each of a pair of strain gages 21 is mounted in proximity to electrodes 17 from base 13 to respective edges of MEMS steerable electrode 15. As an alternative (not shown), Strain gages 21 may be mounted on springs 19. In either case, as a strain gage is stretched or compressed a change in resistance occurs. This change in resistance has a direct, nearly linear, relationship to the deflection of MEMS steerable mirror 15. It may be seen that, in this embodiment, the position detection circuitry, including strain gages 21, is independent of the MEMS element actuation circuitry, including electrodes 17 together with the back of mirror 15.

Figure 2:
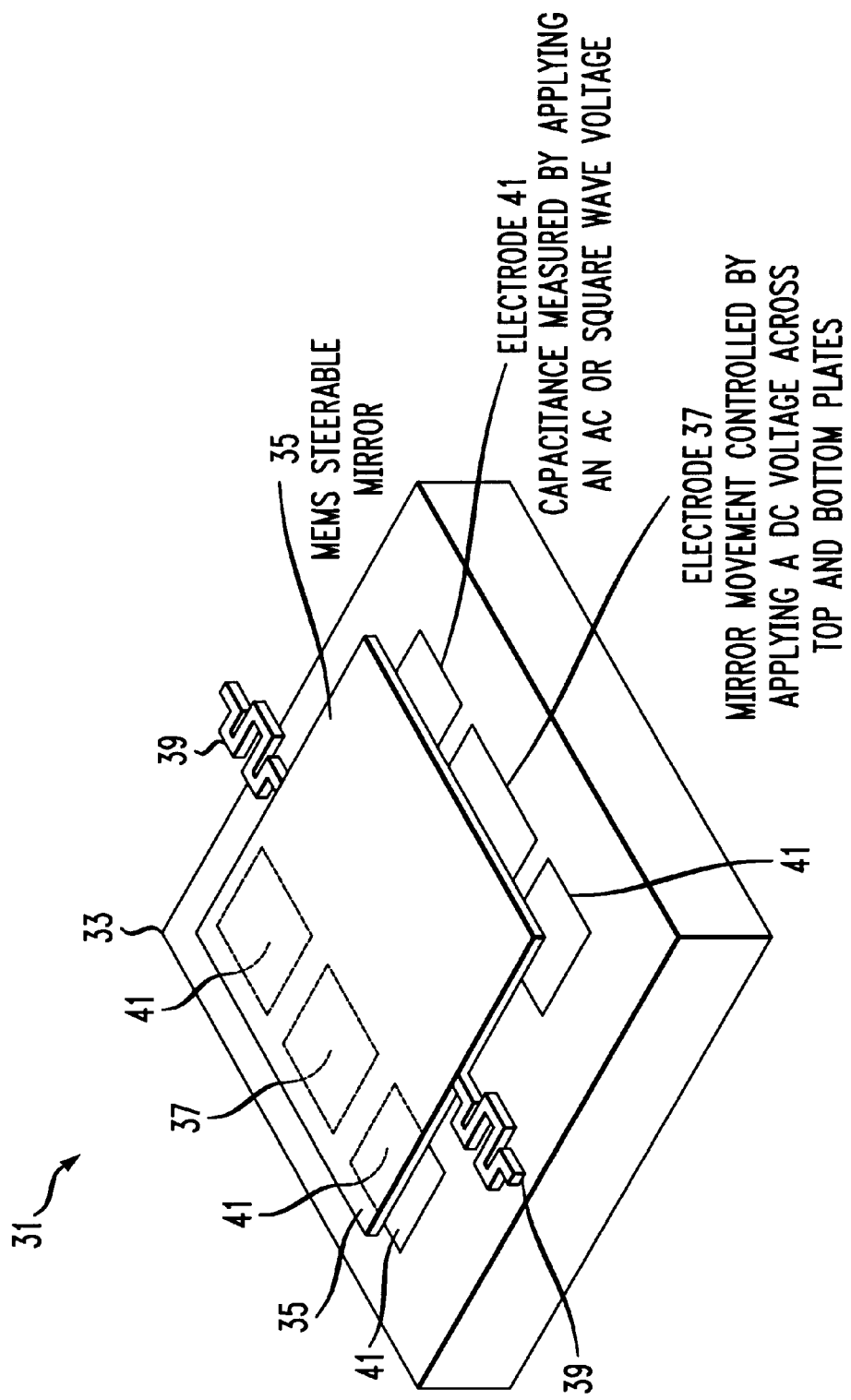
FIG. 2 is a pictorial illustration of a second embodiment of the invention.

In FIG. 2 MEMS device 31 has a semiconductor wafer substrate forming a base 33 for a MEMS element array, of which MEMS steerable mirror 35 is a typical element. MEMS steerable mirror 35 is suspended on springs 39, which support it in a nominal position parallel to base 33. Plate electrodes 37 form a pair of parallel plate capacitors with the conductive back of MEMS steerable mirror 35. Electrodes 37 are arranged so that opposite polarity voltages apply a pulling deflection torque to MEMS steerable mirror 35 on just one side.

Position detection capacitors are formed with the back of MEMS steerable mirror 35 by auxiliary electrodes 41. Auxiliary electrodes 41 may be separate from electrodes 37, or an extension thereof To measure the capacitance of electrodes 41 with respect to the back of MEMS steerable mirror 35, a relatively high frequency is applied (by a test signal generator not shown) between the back of MEMS steerable mirror 35 and electrodes 41. Another relatively low frequency is applied between the back of MEMS steerable mirror 35 and electrodes 37. That frequency is low enough to produce a deflection of MEMS steerable mirror 35.

In operation, whether or not electrodes 41 are joined to adjacent electrodes 37 (as may be advantageous in an integrated circuit embodiment), the position detection operation remains independent of the actuation operation because the higher frequency used for position detection has substantially no effect on the actuation, which is the deflection of MEMS steerable mirror 35. Further, this embodiment is adapted for application in an optical cross-connect switching system by an array of movable mirror like mirror 35 on a common substrate, the array being coupled to an array of optical fibers. In such an array of movable elements and sensors, the signal of each sensor is specific to one movable element.

Figure 3:
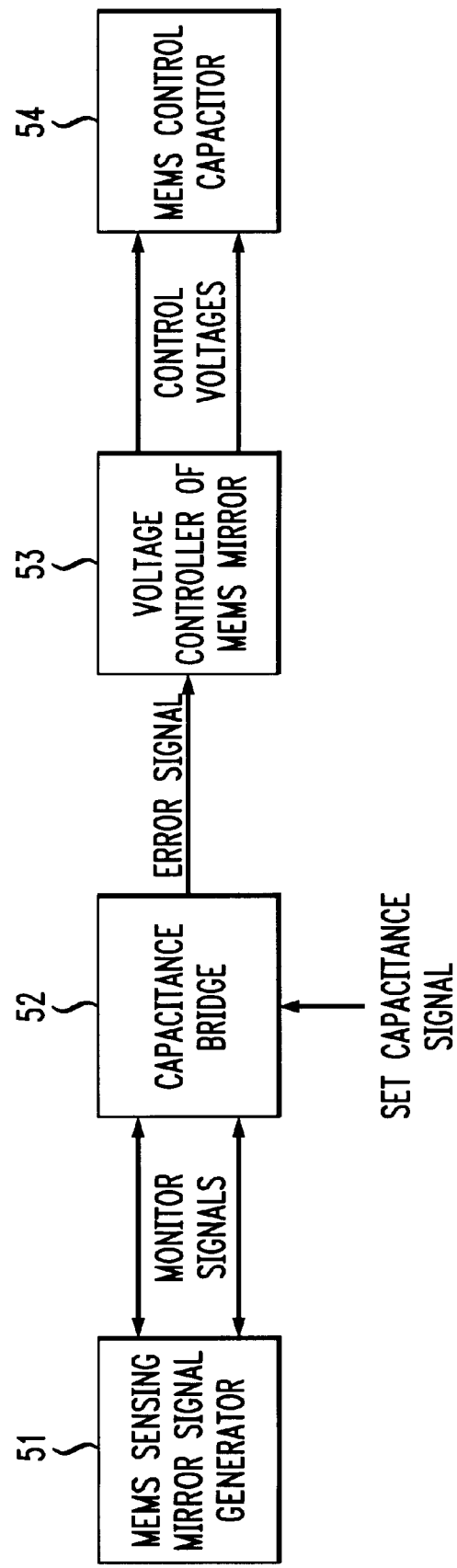
FIG. 3 is a block diagrammatic illustration of a control arrangement for the embodiment of FIG. 2.

FIG. 3 shows in block diagram form a preferred type of control circuitry for the embodiment of FIG. 2. In signal generator 51, signals from each combination of HEMS steerable mirror 35 and a sensing electrode 41 (there being four such electrodes for one mirror 35) are combined in known fashion or sent in a pair of signal paths to capacitance bridge 52, which separately receives a signal representing a reference capacitance. This signal also represents a desired deflection of mirror 35, as determined by external control circuitry. An error signal from the balance terminals of capacitance bridge 52 is sent to voltage controller 53, which generates and applies a corrective signal to deflection electrode 37 for MEMS mirror 35. Electrode 37 and MEMS mirror 35 form a MEMS control capacitor 54. Each of signal generator 51, capacitance bridge 52, and voltage controller 53 can be implemented in any of several known manners, to the extent that they are mutually compatible.

In the operation of FIG. 3, the signal to set the reference capacitance of bridge 52 is calibrated for a particular steerable mirror 35 by observing the spots to which that mirror 35 reflects an optical beam. For an array (not shown) of steerable mirrors, separate calibrations for each mirror is stored in a memory (not shown) of the external control circuitry.

Feedback circuitry for the embodiment of FIG. 1 can also be implemented in any of several known manners, including using a bridge analogous to that of FIG. 3.

Figure 4:
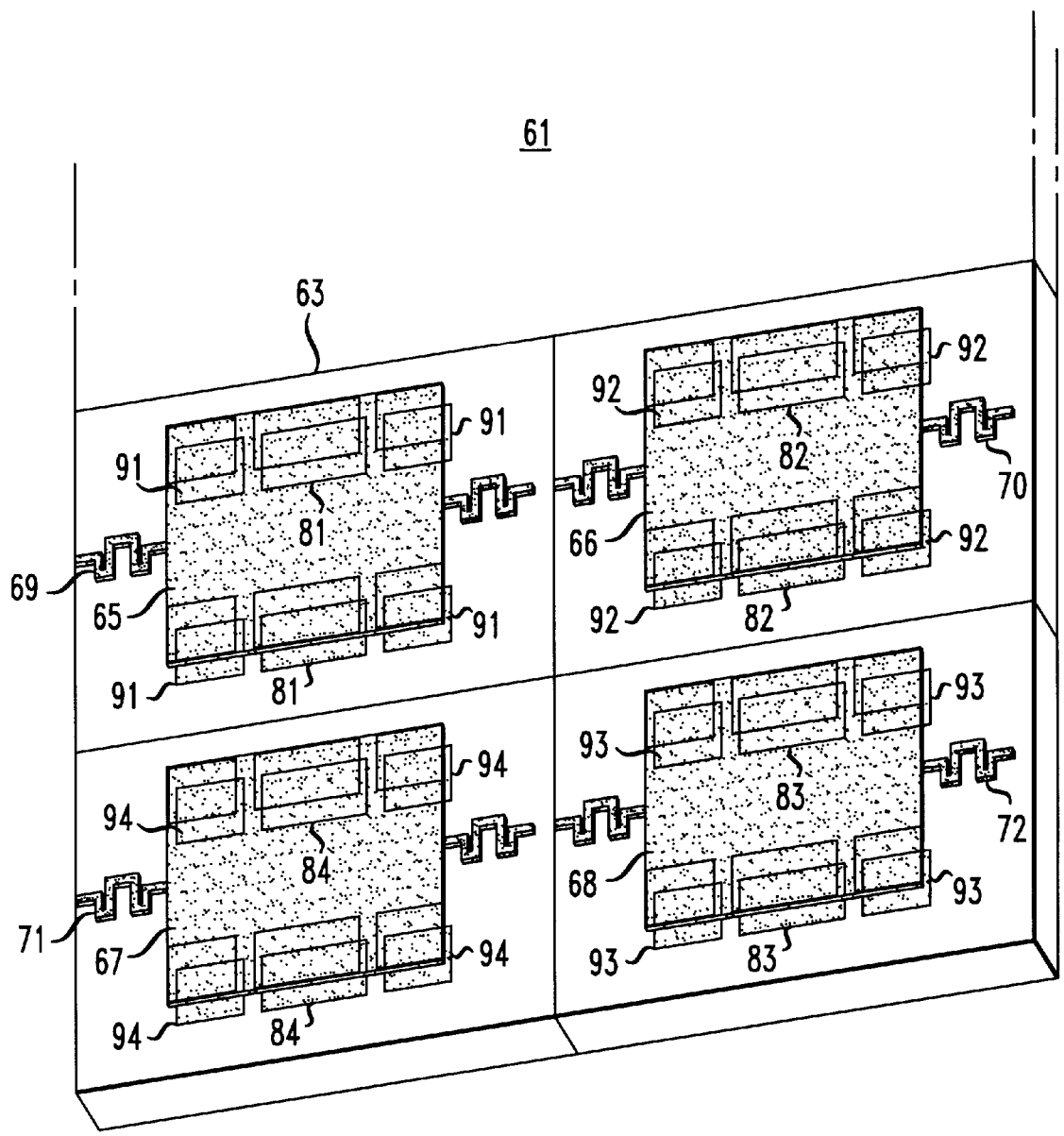
FIG. 4 is a pictorial illustration of an array implementation of the second embodiment of the invention.

In FIG. 4 MEMS device 61 has a semiconductor wafer substrate forming a base 63 for a MEMS element array, including MEMS steerable mirrors 65, 66, 67, and 68, as typical elements. These mirrors are suspended on springs 69, 70, 71, and 72, respectively, which support the mirrors in nominal positions parallel to base 63. Plate electrodes 81, 82, 83, and 84, respectively form a pair of parallel plate capacitors with the conductive back of MEMS steerable mirror 65, 66, 67, and 68. Electrodes 81, 82, 83, and 84 are arranged so that opposite polarity voltages apply a deflection torque to the respective MEMS steerable mirror.

Position detection capacitors are formed with the back of MEMS steerable mirrors 65, 66, 67, and 68, by auxiliary electrodes 91, 92, 93, and 94, which may be separate from electrodes 81, 82, 83, and 84, or may be extensions thereof To measure the capacitance of electrodes 91, 92, 93, and 94 with respect to the back of MEMS steerable mirrors 65, 66, 67, and 68, a relatively high frequency is applied (by a test signal generator not shown) across each respective capacitor. Another relatively low frequency is applied between the back of each MEMS steerable mirror and the respective one of drive electrodes 81, 82, 83, and 84. That frequency is low enough to produce a deflection of the MEMS steerable mirror.

The operation of each element of the array of FIG. 4 is like that of the corresponding element of FIG. 2. It should be apparent that the four-element array of FIG. 4 can be extended to a large number of elements. In such an array, each movable MEMS element has in direct association a plurality of sensors that serve only it.

It should be apparent that the foregoing embodiments can be modified, and other embodiments (e.g., embodiments having piezoelectric, piezoresistive, or pressure type sensing arrangements) can be implemented, without departing from the spirit and scope of the invention, as determined by the following claims and their equivalents.

The claimed invention is:

1. A microelectromechanical device comprising:
   a microelectromechanical movable element;
   a base element with respect to which said movable element is movable, said base element comprising a semiconductor substrate;
   means associated with said movable element for moving said movable element with respect to said semiconductor substrate, said moving means comprising a first electrode on one of said movable element and said semiconductor substrate for receiving a voltage to move said movable element with respect to said semiconductor substrate; and
   means operationally independent of said means for moving and adjoining at least one of said movable element and said base element for sensing the actual position of said movable element with respect to said base element to yield a sensed position signal.

2. The microelectromechanical device according to claim 1, further including means for applying the sensed position signal to the first electrode to control the movement of the movable element.

3. The microelectromechanical device according to claim 2, wherein the means for moving the movable element comprises a second electrode on the other of the movable element and the semiconductor substrate and facing the first electrode, and the means for applying the sensed position signal is coupled to the the first and second electrodes to apply a voltage between those electrodes.

4. The microelectromechanical device according to claim 1, further including an additional plurality of microelectromechanical movable elements in proximity to said semiconductor substrate and an additional plurality of means for sensing the actual positions of respective ones of said additional plurality of movable elements with respect to said semiconductor substrate to yield respective individual sensed position signals for each of said movable elements.

5. The microelectromechanical device according to claim 1, wherein said means for sensing the actual position of the movable element comprises at least one strain gage.

6. The microelectromechanical device according to claim 1, wherein said means for sensing the actual position of the movable element comprises a capacitive element arranged to have a capacitance varied by the movement of the movable element.

7. A microelectromechanical device comprising:

a plurality of microelectromechanical movable elements;

a base element with respect to which said plurality of movable elements are movable, said base element comprising a semiconductor substrate in proximity to said microelectromechanical movable elements and with respect to which said microelectromechanical movable elements are movable;

a plurality of means each associated with a respective one of said plurality of movable elements for moving said respective one of said plurality of movable elements with respect to said semiconductor substrate, said plurality of moving means comprising a plurality of first electrodes, a respective electrode of said plurality of first electrodes being on one of said respective one of said plurality of movable elements and said semiconductor substrate in proximity to said respective one of said plurality of movable elements for receiving a voltage to move said respective one of said plurality of movable elements with respect to said semiconductor substrate; and a plurality of sensors associated with said plurality of movable elements, at least a respective one of said plurality of sensors being a direct sensor for a respective one of said plurality of movable elements for sensing the actual position of said respective one of said plurality of movable elements with respect to said base element to yield a respective sensed position signal.

8. The microelectromechanical device according to claim 7, further including means for applying the respective sensed position signal to a respective first electrode of the respective means for moving to control the movement of the respective one of said plurality of movable elements.

9. The microelectromechanical device according to claim 8, wherein the means for moving the respective one of the plurality of movable elements comprises a second electrode on the other of said respective one of the plurality of movable elements and said semiconductor substrate in proximity to said respective one of said plurality of movable elements, the second electrode facing the respective first electrode for receiving a voltage therebetween to move said respective one of the plurality of movable elements, and the means for applying the respective sensed position signal is coupled to the first and respective second electrodes for said respective one of the plurality of movable elements to apply voltage corresponding to the respective sensed position signal between those electrodes.

10. The microelectromechanical device according to claim 7, wherein said at least one of the plurality of sensors for sensing the actual position of the respective one of the plurality of movable elements comprises at least one strain gage.

11. The microelectromechanical device according to claim 7, wherein said at least one of the plurality of sensors for sensing the actual position of the respective one of the plurality of movable elements comprises at least one capacitive element arranged to have a capacitance varied by the movement of the respective one of the plurality of movable elements.

12. A microelectromechanical device comprising:

a microelectromechanical movable element;

a base element with respect to which said movable element is movable, said base element comprising a semiconductor substrate;

means associated with said movable element and said base element for moving said movable element, said means for moving comprising an electrode on at least one of said movable element and said semiconductor substrate for moving said movable element with respect to said semiconductor substrate; and means operationally independent of said means for moving and adjoining at least one of said movable element and said semiconductor substrate for sensing the actual position of said movable element with respect to said semiconductor substrate to yield a sensed position signal, said means for moving and said means for sensing having an electrode element in common.

13. The microelectromechanical device according to claim 12, further including means for applying the sensed position signal to said means for moving to control the movement of said movable element.

14. The microelectromechanical device according to claim 12, further including an additional plurality of microelectromechanical movable elements, an additional plurality of means each associated with a respective one of said plurality of movable elements for moving said respective one of said plurality of movable elements with respect to said semiconductor substrate, said plurality of moving means comprising a plurality of first electrodes, a respective electrode of said plurality of first electrodes being on one of said respective one of said plurality of movable elements and said semiconductor substrate in proximity to said respective one of said plurality of movable elements for receiving a voltage to move said respective one of said plurality of movable elements with respect to said semiconductor substrate;

and an additional plurality of means for sensing the actual positions of said additional plurality of movable elements with respect to said semiconductor substrate to yield respective individual sensed position signals for each of said additional plurality of movable elements, each of said additional plurality of sensing means having an electrode element in common with the electrode of a respective one of said additional plurality of moving means even though operationally independent thereof.

15. The microelectromechanical device according to claim 14, wherein each of said means for sensing the actual position of the respective one of the movable elements comprises a capacitive element arranged to have a capacitance varied by the movement of the movable element, said means for moving and said means for sensing having the electrode element in common as a portion of the capacitive element.

16. The microelectromechanical device according to claim 15, wherein, for each movable element, the other of the movable element and the semiconductor substrate has a second electrode facing the first electrode of the respective moving means, and motion of movable element is produced by a voltage difference between the first and second electrodes.

* * * * *